US012490092B2

(12) United States Patent
Neipris et al.

(10) Patent No.: US 12,490,092 B2
(45) Date of Patent: Dec. 2, 2025

(54) WPA3-PERSONAL CLOUD BASED NETWORK ACCESS AND PROVISIONING

(71) Applicant: DISH Network L.L.C., Englewood, CO (US)

(72) Inventors: Edward W. Neipris, Wrentham, MA (US); Joshua David Wade, Castle Rock, CO (US); Tyler Nesper, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 246 days.

(21) Appl. No.: 18/445,079

(22) Filed: Mar. 29, 2023

(65) Prior Publication Data

US 2024/0121609 A1 Apr. 11, 2024

Related U.S. Application Data

(60) Provisional application No. 63/325,017, filed on Mar. 29, 2022.

(51) Int. Cl.
*H04W 12/069* (2021.01)
*H04W 12/0471* (2021.01)
*H04W 12/08* (2021.01)

(52) U.S. Cl.
CPC ..... *H04W 12/069* (2021.01); *H04W 12/0471* (2021.01); *H04W 12/08* (2013.01)

(58) Field of Classification Search
CPC ........... H04W 12/069; H04W 12/0471; H04W 12/08; H04W 84/12; H04W 12/009; H04W 12/043; H04W 12/61; H04W 12/041; H04L 63/102; H04L 63/108
See application file for complete search history.

(56) References Cited

U.S. PATENT DOCUMENTS

| | | | |
|---|---|---|---|
| 11,432,138 B1* | 8/2022 | Jiang | H04L 63/062 |
| 11,963,075 B1* | 4/2024 | Bahr | H04W 76/15 |
| 2017/0230824 A1* | 8/2017 | Li | H04L 63/123 |
| 2018/0332441 A1* | 11/2018 | Shaw | H04L 41/122 |

(Continued)

FOREIGN PATENT DOCUMENTS

WO 2021/067082 A1 4/2021

OTHER PUBLICATIONS

International Search Report and Written Opinion for PCT/US2023/000013 mailed Jun. 19, 2023, all pages.

*Primary Examiner* — Mohammed Waliullah
(74) *Attorney, Agent, or Firm* — Kilpatrick Townsend & Stockton LLP

(57) ABSTRACT

Systems, methods, and non-transitory, machine-readable media may facilitate wireless network provisioning. In one example, a method for provisioning wireless network access to a wireless device includes: creating, in a cloud-based provisioning system, a wireless network access profile that includes a user identifier associated with the wireless device, receiving, on an access point, an authentication request sent from the wireless device, identifying, by the cloud-based provisioning system, the wireless device based on the user identifier associated with the wireless device, performing, on the cloud-based provisioning system, WPA3-based authentication to authenticate the wireless device, and providing, by the access point, network access to the wireless device.

18 Claims, 7 Drawing Sheets

(56) References Cited

U.S. PATENT DOCUMENTS

| | | | |
|---|---|---|---|
| 2019/0116493 A1* | 4/2019 | Cyril | H04W 12/06 |
| 2019/0313246 A1* | 10/2019 | Nix | H04W 12/069 |
| 2020/0036533 A1* | 1/2020 | Soundararajan | H04W 12/61 |
| 2020/0396604 A1* | 12/2020 | Olshansky | H04L 63/083 |
| 2021/0099876 A1* | 4/2021 | Neipris | H04W 4/50 |
| 2021/0345112 A1* | 11/2021 | Elliott | H04W 12/122 |
| 2023/0262097 A1* | 8/2023 | Henry | H04W 12/009 726/3 |

* cited by examiner

WPA3-PERSONAL CLOUD BASED NETWORK ACCESS AND PROVISIONING

CROSS-REFERENCES TO RELATED APPLICATIONS

This application claims priority to U.S. Provisional Patent Application No. 63/325,017, filed on Mar. 29, 2022, the disclosure of which is incorporated by reference in its entirety for all purposes.

BACKGROUND OF THE INVENTION

Wireless networks are vulnerable to attacks such as eavesdropping, packet sniffing, and data theft. Enabling a wireless device for wireless network access can present challenges. Traditional security protocols such as WPA2, WPA, or older versions may help to protect against attacks by providing a secure encryption method for wireless connection and communication between a wireless device and a wireless network. For example, WPA2 may include features such as key management, authentication, and data integrity checks to further enhance security. While WPA and WPA2 are effective at improving wireless network security, there still remains challenges. For example, both WPA and WPA2 use pre-shared keys (PSK) for authentication, which may be vulnerable to brute-force attacks if the PSK is not appropriately managed and used. If an attacker can obtain the PSK, they can potentially decrypt all network traffic. In addition, WPA and WPA2 may have limited use if the wireless device attempting to connect to the wireless network does not have a user interface that can be used to present such a request and gather user credentials. For example, many Internet-of-Things (IoT) devices, such as sensor devices, may not have a user interface that would be sufficient for a user to efficiently input such credentials.

BRIEF SUMMARY OF THE INVENTION

In accordance with some embodiments of the present disclosure, a method is provided. In one example, a method includes: creating, in a cloud-based provisioning system, a wireless network access profile that includes a user identifier associated with the wireless device, receiving, on an access point, an authentication request sent from the wireless device, identifying, by the cloud-based provisioning system, the wireless device based on the user identifier associated with the wireless device, performing, on the cloud-based provisioning system, WPA3-based authentication to authenticate the wireless device, and providing, via the access point, wireless network access to the wireless device.

In some embodiments, the method further includes: receiving, by the cloud-based provisioning system from the wireless device via the access point, an authentication request that is generated by the wireless device, the authentication request including a user-provided PSK and a user-provided password identifier; comparing the user-provided password identifier with a password identifier provided in the wireless network access profile to identify a match, and In response to the identified match, providing network access to the wireless device.

In some embodiments, the method further includes: generating, by the wireless device, a public-private key pair that comprises a public key and a private key, receiving, on the cloud-based provisioning system, the public key sent from the wireless device, sending a verification request to the wireless device, receiving, on the cloud-based provisioning system, a response message sent from the wireless device, the response message containing a signature value signed by the private key, and verifying, by the cloud-based provisioning system, the signature value using the public key.

In some embodiments, the method further includes: generating, on the wireless device, a first group element and a first scalar value using an agreed-upon algorithm between the wireless device and the authentication system, receiving, on the cloud-based provisioning system, a commit message sent from the wireless device via the AP, the commit message including the first group element, generating, on the cloud-based provisioning system, a second group element and a second scalar value using the agreed-upon algorithm, transmitting the second group element to the wireless device, generating, on the wireless device, a first shared secret key based on the first scalar value and the second group element using the agreed-upon algorithm, generating, on the authentication system, a second shared secret key based on the second scalar value and the first group element using the agreed-upon algorithm, and identifying, by the authentication system, a match of the first shared secret key and the second shared secret key.

In another example, a method includes: creating a wireless network access profile for a wireless device, the wireless network access profile storing a pre-shared key (PSK) associated with the wireless device, a password identifier corresponding to the PSK, and a user identifier associated with the PSK and the password identifier, receiving an authentication request sent from the wireless device, the authentication request including a user-provided PSK and a user-provided password identifier, performing WPA3-based authentication by comparing the user-provided PSK and user-provided password identifier with the stored PSK and the stored password identifier in the wireless network access profile, respectively, identifying a match between the user-provided PSK and the stored PSK and between the user-provided password identifier and the stored password identifier, and in response to the identified match, providing network access to the wireless device.

In accordance with some embodiments of the present disclosure, a cloud-based provisioning system is provided. In one example, the cloud-based provisioning system includes one or more processors and a computer-readable storage medium storing computer-executable instructions that, when executed by the one or more processors, causes the cloud-based provisioning system to: create a wireless network access profile for a wireless device, the wireless network access profile storing a pre-shared key (PSK) associated with the wireless device, a password identifier corresponding to the PSK, and a user identifier associated with the PSK and the password identifier, receive an authentication request sent from the wireless device, the authentication request including a user-provided PSK and a user-provided password identifier, perform WPA3-based authentication by comparing the user-provided PSK and user-provided password identifier with the stored PSK and the stored password identifier in the wireless network access profile, respectively, identify a match between the user-provided PSK and the stored PSK and between the user-provided password identifier and the stored password identifier, and in response to the identified match, provide network access to the wireless device.

In accordance with some embodiments of the present disclosure, a non-transitory processor-readable medium is described. The medium may include processor-readable instructions configured to cause one or more processors to perform any method or operations thereof described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Overview

Figure 1:
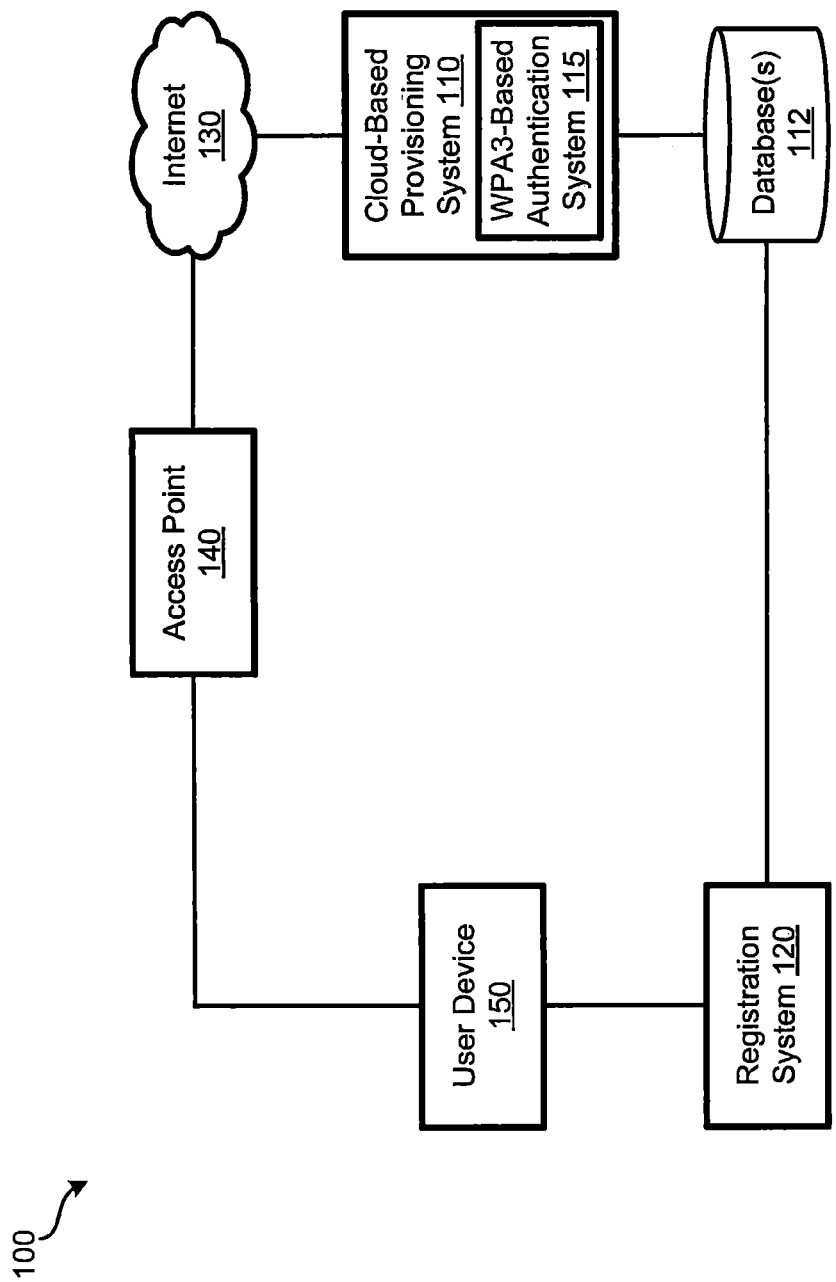
FIG. 1 is a schematic diagram illustrating an example of a communications system according to various embodiments.

The present disclosure provides techniques for authenticating devices and provisioning network services or resources to the wireless-enabled devices using WPA3-based authentication protocols.

One insight provided in the present disclosure is that the methods described herein utilize Wi-Fi Protected Access 3 (WPA3) based authentication process to authenticate wireless-enabled devices. WPA3 is the latest version of the Wi-Fi security protocol that is used to protect wireless networks. WPA3 provides a number of improvements over the older version of WPA protocols such as WPA and WPA2, including stronger encryption and more robust protection against attacks. WPA3 also adds new features such as Simultaneous Authentication of Equals (SAE), which enhance security and privacy for users. Notably, one of the main improvements of WPA3 is the use of a key exchange process with 256-bit encryption, which provides stronger protection against brute-force attacks. WPA3 also introduces the use of forward secrecy, which ensures that even if an attacker manages to obtain the Wi-Fi network password, they will not be able to decrypt previously captured data. WPA3 includes new security features that make it more difficult for attackers to guess passwords and gain unauthorized access to wireless network services or resources. WPA3 also enables a simplified configuration and simplified data exchange process between the wireless device and the access point during authentication.

Another insight provided in the present disclosure is that the methods described herein could employ Device Provisioning Protocol (DPP) to facilitate WPA3-based authentication and network service provisioning. DPP is a new feature of the WPA3 protocol that allows wireless-enabled devices to securely exchange network credentials without the need for a pre-shared key or manual configuration. In some embodiments according to the present disclosure, DPP may use a secure public key infrastructure (PKI) to enable devices to authenticate and securely exchange network credentials. This eliminates the need for users to manually enter a wireless network password, which can be time-consuming and potentially insecure. For example, the DPP protocol can be used to support multiple deployment models, including QR code scanning, Near-Field Communication (NFC), and Bluetooth Low Energy (BLE). DPP also provides several benefits for wireless network administrators and users by simplifying the process of adding new devices to a network and reducing the risk of unauthorized access or password sharing. DPP also supports secure network onboarding for devices that do not have a user interface, such as IoT sensors and smart home devices.

A further insight provided in the present disclosure is that the methods described herein utilize common data storage techniques coupled with standards-based communication protocols to create a process that securely authenticates wireless-enabled devices and provisions wireless network services or resources to the authenticated devices. According to some embodiments, the present methods provide a means to create a profile that associates a unique and verified user identifier (such as an email address, customer loyalty number, apartment number, or patient record identifier, etc.) with a WPA3 pre-shared key and password identifier for wireless-enabled devices. In addition, the present method provides a means to limit or grant or control access to any number of these wireless-enabled devices to any number of managed networks based on the associated WPA3 pre-shared key, password-identifier, and an applied set of logical rules. By moving this new method to a globally available cloud authentication and provisioning can be performed on any network in the world utilizing the same pre-shared key and password identifier. Lastly, the present methods allow the authenticated devices to be automatically provisioned onto the managed network(s) and gain access to global Internet or IP resources according to an applied set of logical rules.

Example Systems and Methods

FIG. 1 is a schematic diagram illustrating an example of a communications system 100 according to various embodiments. In the illustrated example, the communications system 100 includes, among other components, cloud-based provisioning system 110; database(s) 112; registration system 120; Internet 130; access point (AP) 140; wireless enabled device (hereinafter "wireless device") 150.

Registration system 120 can include one or more computer devices or computer systems (e.g., the example shown in FIG. 7) and may be operated or configured by an administrator that is tasked with managing access to a wireless network hosted by an AP. When one or more of a user's wireless devices is to be provided access to the wireless network, registration system 120 may be used to generate a unique pre-shared key (PSK). Similar to a conventional Wi-Fi network, a user can select a wireless network based on the wireless network's Service Set Identifier (SSID) and input a PSK. In the embodiments detailed herein, the PSK can be particular to a user (or group of users)

and can have been provided to the user separately (e.g., in a registration email, via text message, orally, on paper, etc.) to the user.

In some embodiments, the user may be permitted to define his own PSK or a portion of the PSK (with registration system 120 defining the remainder). The unique PSK may be required to be unique compared to other PSKs used by cloud-based provisioning system 110. The PSK can be provided to only the user or a small group of related users (e.g., residents of a particular apartment, members of a particular travel party). Registration system 120 may be used to transmit a message to the user indicative of the unique PSK, the SSID of the wireless network, a unique user identifier associated with the user (e.g., a username, an email address, a customer loyalty number, an apartment number, a hotel room number, a patient record identifier, a MAC address of the wireless device, an employee ID, a home address, a birthdate, a membership number, a biometric data (e.g., fingerprint or face recognition), reservation number, social security number, user-created password, etc.) and/or other details and/or rules that may be pertinent to the user, such as the times and dates during which the user is authorized to access the wireless networks, the bandwidth allocated to the user, access and/or creation of personal area networks (PANs), and access to virtual local area networks (VLANs), etc.

Registration system 120 can transmit the message in many forms to the user. For instance, an email may be transmitted to an email address on record for the user; a text message may be sent to a mobile phone number of the user; a paper letter may be addressed and mailed to the user (e.g., as part of a reservation or welcome package for a hotel); a representative or automated system may call (or otherwise talk to) the user (e.g., at hotel check-in), a message may be presented on a display screen for the user to read, a code may be presented for a user to image with his device, an NFC, Bluetooth®, or other short-range data transfer may be performed, etc.

Registration system 120 may be in direct communication with cloud-based provisioning system 110 or may communicate with cloud-based provisioning system 110 via a network, such as Internet 130. Alternatively, registration system 120 and cloud-based provisioning system 110 may function as software-implemented components of the same server system. In some embodiments, registration system 120 can directly access database(s) 112.

The database(s) 112 may include, among other components, a PSK database, a profile database, and a rule database. The PSK database may be used to store the PSKs associated with the wireless devices. The profile database may be used to store the wireless access profile associated with the wireless dataset. The rule database may be used to store pre-established rules for wireless access.

In addition to the unique PSK being provided to the user, the wireless network access profile may be created in profile database based on the data obtained from registration system 120 to profile database. The wireless network access profile can include: the unique PSK, the SSID of the wireless network, the unique user identifier associated with the user. The rules database may include rules that are pertinent to the user (e.g., times and dates during which access to the wireless network is permitted via the wireless network access profile, the amount of bandwidth allocated, access to PANs, access to VLANs), and data relevant to the use of the wireless network access profile (e.g., whether the unique PSK has been used for wireless network access previously).

AP 140 can represent a device that creates a wireless network or serves as a portion of a wireless network through which one or more wireless devices, if properly authorized, can access the Internet and/or some other public or private network. In the illustrated embodiment, a single AP is present. AP 140 uses WPA3-based protocol as the security protocol for protecting network communications. It should be understood that embodiments detailed herein may be adapted and used with other communication protocols and security protocols.

Wireless devices, such as wireless device 150 may generally be any form of computerized device that is capable of communicating with a wireless network. Examples of the wireless device include but are not limited to smartphones, tablets, laptops, smart home devices, and Internet of Things (IoT) devices. In some embodiments, one or more wired networking devices may also be present. For example, wired networking devices may be connected directly to AP 140 using a cable (e.g., an Ethernet cable). Once access for a wireless device, such as wireless device 150 to the wireless network is granted, the wireless device may also be able to communicate with some or all wired devices connected with the network.

For the example of IoT device (e.g., a sensor device, home automation device), no user interface or a limited user interface may be present. While IoT device may require or benefit from network connectivity, it may be difficult or impossible for a user to perform some forms of network authentication for IoT device. In some embodiments, to configure IoT device, an application may be executed on another device, such as wireless device 150. Through such a device, the user may be able to provide credentials that IoT device can use to perform authentication with AP 140.

Wireless device 150 can include smartphones, tablet computers, laptop computers, desktop computers, gaming devices, smart televisions, home assistant devices, smart doorbells, smart smoke detectors, smart carbon monoxide detectors, streaming video cameras, set top boxes (STBs), etc. When a user desires a wireless device, such as wireless device 150 in this example, to initially communicate with a wireless network, the user may input or select the correct SSID and input the unique PSK into wireless device 150 as provided by registration system 120.

Wireless device 150, for example, may perform an initial pairing procedure to determine if the unique PSK grants access to the wireless network created by AP 140. Wireless device 150 may also generate a commit message to be used in the key exchange process based on the Simultaneous Authentication of Equal (SAE) protocol unique to the WPA3-based authentication process. It is noted that the SAE process may use a more secure method of authentication, which prevents attackers from using offline dictionary attacks to discover the Wi-Fi password. SAE process may use a unique password (e.g., derived from the commit message) for each connection, which is generated by the wireless device 150 and the AP 140 during the authentication process. In some embodiments, a handshaking procedure, such as the WPA3 4-way handshake, may be performed after the SAE is performed.

AP 140 may transmit the messages received from wireless device, along with any other data needed, such as the EAPoL frame, the AP MAC address, and the wireless device's MAC address to cloud-based provisioning system 110 via the Internet 130 (or, additionally or alternatively, some other public and/or private networks or directly). In some embodiments, when a SAE protocol is used in the authentication process, AP 140 may communicate with the wireless device 150 by transmitting a challenge message in response to a request sent from the wireless device 150. AP 140 may further transmit a hash value generated by the wireless device 150 to cloud-based provisioning system 110 to verify the hash value.

Cloud-based provisioning system 110 includes a WPA3-based authentication system 115. The cloud-based provisioning system 110 and the WPA3-based authentication system 115 can include one or more computer server systems that communicate with one or more databases 112 stored using non-transitory processor-readable mediums.

Profile database stores wireless network access profiles. For instance, the wireless network access profile may include: a permissible time range for access; a permissible date range for access; whitelisted and/or blacklisted MAC addresses; an amount of bandwidth; a total amount of uplink and/or downlink data permissible within a given time period (e.g., one month); permissible or impermissible uses (e.g., no video streaming); whether further authentication is needed, a level of access, which networks are permitted to be accessed, etc.

In some embodiments, data from the wireless network access profile is transmitted via Internet 130 (or some other network) to AP 140 and/or other components of the network. In such embodiments, AP 140 may analyze the contents of the wireless network access profile to determine whether wireless device 150 is to be provided network access. In other embodiments, the determination of whether access is permitted is performed by WPA3-based authentication system 115 or cloud-based provisioning system 110. An advantage to transmitting the PMK is that an encryption algorithm may not need to be applied by the AP 140. AP 140 may use the received PSK to complete the handshake procedure with wireless device 150 and begin communicating. This arrangement results in the PSK never being transmitted, in either an encrypted or unencrypted format, between wireless device 150 and AP 140.

In some embodiments, data stored as part of the wireless network access profile in profile database may be dynamic. For instance, when the PSK associated with the wireless network access profile is used by a wireless device to connect with any AP for the first time, one or more additional steps may be required to be performed. Data within the wireless network access profile may indicate whether or not the PSK has previously been used to connect with an AP for which cloud-based provisioning system 110 manages access. For instance, after communication between wireless device 150 and AP 140 is established using the PSK but before AP 140 permits network access (e.g., access to Internet 130), terms of service may be transmitted to wireless device 150 for presentation to and acknowledgement by a user of wireless device 150. Once the terms of service are assented to and an indication of such is received by AP 140, AP 140 may transmit an indication as such to cloud-based provisioning system 110 to modify the wireless network access profile associated with the PSK to indicate that the terms of service have been agreed to and do not need to be presented again. In other embodiments, the terms of service may be provided at a different step in the provisioning process. For instance, in some embodiment, in order to receive the PSK and/or SSID, a user may first be required to assent to terms of service.

In some embodiments, in response to a wireless device being successfully granted access to the wireless network, the MAC address (or some other form of identifier of the wireless device) may be stored and associated with the wireless network access profile or the PSK stored in the wireless network access profile. If the device attempts to reconnect to the wireless network in the future, rather than repeating the entirety of the provisioning process, the MAC address match may be identified.

In some embodiments, additional security beyond the wireless device being used to supply a valid PSK may be desired by the administrator that operates registration system 120. As previously noted, additional information, such as a unique user identifier (e.g., email address, password) may be stored as part of a wireless network access profile in profile database. After the PSK has been validated, the AP may request that the wireless device supply additional information. For instance, AP 140 may request an email address, loyalty identifier/number, apartment number, patient record identifier, or some other form of unique and verified user identifier from a wireless device 150. A user may then supply the email address (or other form of unique user identifier) that was provided during the registration process to registration system 120. Either AP 140 or WPA3-based authentication system 115 or cloud-based provisioning system 110 may verify whether the provided unique user identifier matches the stored unique user identifier within the wireless network access profile. If a match is present, network access may be provided. If a match is not present, network access may not be provided and/or the wireless network access profile may be disabled. Depending on the desire of the administrator of registration system 120, such an additional security step may be performed only once for a given wireless network access profile, may be performed each time the wireless device connects to a new AP, and/or for each new wireless device that uses the PSK to connect with an AP for which access is controlled via cloud-based provisioning system 110.

WPA3-based authentication system 115 may also have capacity and be operable to perform a key exchange process following a SAE-based or a DPP-based protocol. In some embodiments, no PSK is generated and used in the key exchange process. More examples of the SAE-based or DPP-based protocols for authentication are described below with references to FIGS. 5-6.

Figure 2:
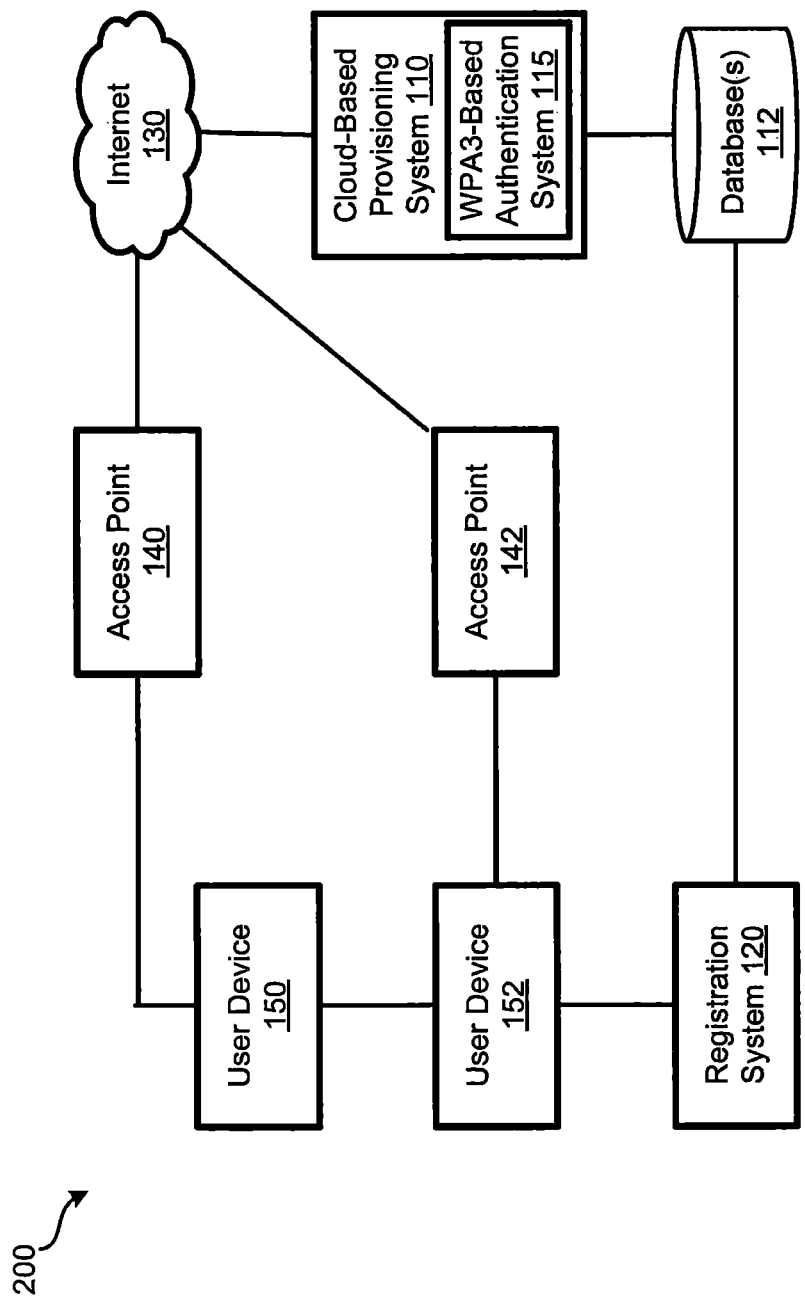
FIG. 2 illustrates a schematic diagram illustrating another example of a communications system according to various embodiments.

In the illustrated embodiment of FIG. 1, a single database 112 that stores the wireless network access profiles may be present. Alternatively, a PMK database and a profile database may be present as distinct databases. In some embodiments, the stored data may be stored across a greater number of databases or other forms of data storage arrangements (e.g., tables). Further, while FIG. 1 and FIG. 2 illustrate cloud-based provisioning system 110 as remotely located from AP 140 and AP 142, in some embodiments, cloud-based provisioning system 110 may be co-located with one or more APs and may communicate without using the Internet. For example, a wired local area network connection may be used.

FIG. 2 illustrates another example of communications system 200. Communications system 200 can function similarly to system 100 of FIG. 1. However, system 200 can include multiple APs, such as: AP 140 and AP 142. AP 140 and AP 142 may be located in geographically disparate locations or may be approximately co-located. Co-located can refer to APs located in a same building, at a same facility, on a same campus, etc. Disparate locations can refer to different buildings, different hotels, different facilities, etc. For instance, a company may wish to provide a user with access to APs across its offices that are scattered across a city, state, country, continent, or the world.

If APs are co-located, as wireless devices move over relatively short distances, such as within a building, the wireless device may switch which AP it communicates with; however, access may remain permitted due to access being managed for both APs by cloud-based provisioning system 110. Similarly, if AP 140 and AP 142 are located in geographically disparate locations, network access can still centrally be managed by cloud-based provisioning system 110. For example, an entity, such as a property rental company, may be able to centrally manage guest access across many properties via cloud-based provisioning system 110.

In some embodiments, AP 140 and AP 142 may represent different base stations of a cellular network. Full or partial access may be granted to the cellular network in a similar fashion to a wireless local area network.

If an initial registration process is performed using a first AP, such as when wireless device 150 previously communicated with AP 140, data stored to profile database may indicate that the wireless device has been permitted access. Therefore, when wireless device 150 accesses AP 142, while the back-end process for AP 142 to obtain the correct authentication information (e.g., PSK, CE, hash value, etc.) may need to be repeated, the terms of service (or some other one-time event) would not need to be presented or repeated by wireless device 150 again by virtue of the wireless network access profile stored in profile database indicating that the event has already occurred. Similarly, if the user (or a related used) re-used the authentication information on another device, since the same wireless network access, profile is used, the terms of service may not need to be presented and assented to.

Figure 3:
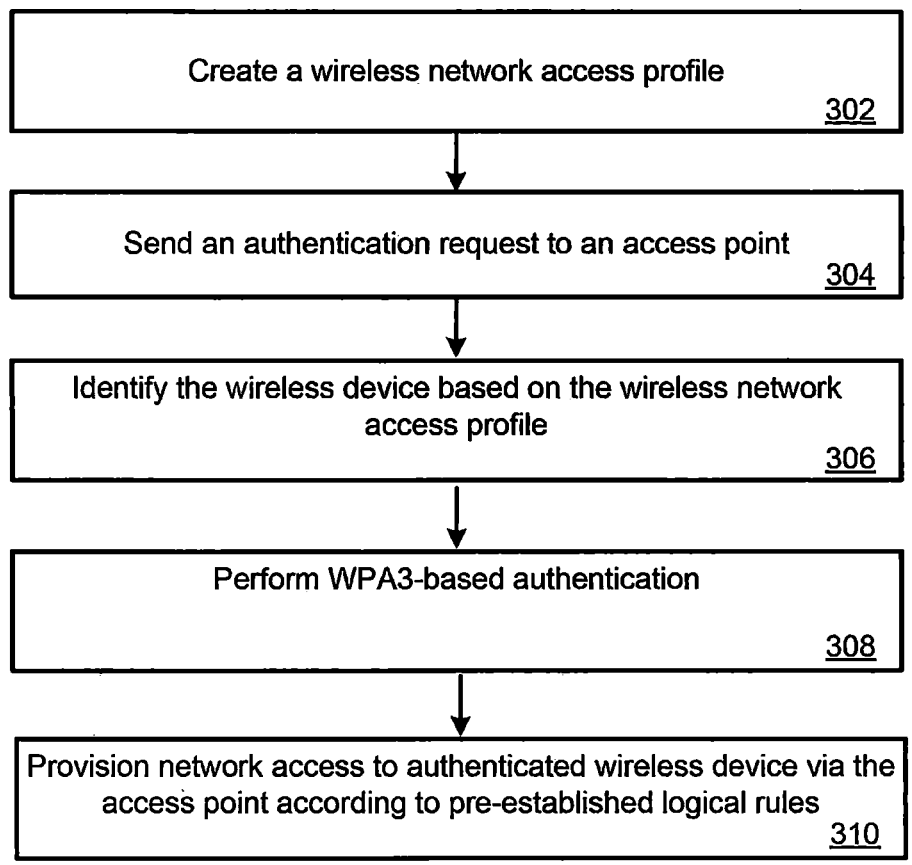
FIG. 3 is a flow diagram illustrating an example method for wireless network provisioning using according to various embodiments.

Various methods may be performed using the detailed systems of FIGS. 1 and 2. FIG. 3 illustrates an example method 300 for wireless network provisioning. Method 300 may be performed using system 100, system 200, or some other form of system that allows for wireless network provisioning using WPA3-based authentication. Depending on the implementation, the method 300 may include additional, fewer, or alternative steps performed in various orders or in parallel.

At 302, a wireless network access profile is created. As mentioned above, the wireless network access profile may include PSK, a password identifier, a unique and verified user identifier associated with the PSK, a user identifier including user credentials and device information, or other information related to the user and/or the wireless device. Other information or data could also be included in the WPA3 wireless network access profile, such as primary connection location, device access MAC addresses, acceptance of Acceptable Use Policies, etc. This data may be organized in a pre-defined data structure and stored as one or more data tables in some type of relational database system such as Microsoft SQL Server or Microsoft Access and may follow common rules of normalization.

In some embodiments, the wireless network access profile is created directly by the user of the wireless device. As an example, the user of the wireless device may manually enter the profile information (e.g., a user identifier, user credentials, and device information related to the wireless device information, etc.) in a user interface such as a webpage. The profile information is captured and further organized and stored in the profile database. The user interface may be exposed to an integrate-able system such as a Property Management System. Once the integrate-able system creates the required data, it sends the required data to the data repository such as the profile database connected to the cloud-based provisioning system. In another embodiment, the wireless network access profile is created by an authorized representative. A pre-defined Manual Data Entry process may be utilized by the authorized representative to help the user to identify and enter the correct information and store the information into the profile database.

At 304, an authentication request is sent to an AP that supports WPA3 authentication. The authentication request may indicate an attempt to access the network services or resources (i.e., Internet) through the AP and include user credentials and information provided or entered by the user (e.g., user-provided PSK, user-provided password identifier, user-provided user identifier, etc.). Once the authentication request is received by the AP, the AP may transmit all or selected data included in the authentication request to the cloud-based provisioning system.

At 306, the wireless device is identified by the authentication system, based on the wireless network access profile associated with the wireless device. A search may be performed to locate the wireless network access profile in the profile database connected to the cloud-based provisioning system. The information such as the user identifier, user credentials, and the device information of the wireless network access profile may be retrieved and compared with the user-provided information included in the authentication request sent from the wireless device to confirm that the identity match of the wireless device.

At 308, WPA3 authentication is performed, by the authentication system of the cloud-based provisioning system, to authenticate the wireless device based on the wireless network access profile. Typically, the data or information provided by the user or sent from the wireless device are compared with the wireless network access profile previously registered on the cloud-based provisioning system and stored in the database to identify a match. If a match is identified, the wireless device is authenticated. To enable wireless devices for access to network services or resources, the data or information provided by the user must be presented in a pre-defined manner to allow the authentication system to properly utilize the data information. This presentation could include, but not be limited to, moving data to a temporary data table within the database management system; setting option fields in existing data tables to identify the network access is being requested from; providing data fields join to present the data to the authentication system. The WPA3 authentication may be performed using PSK. Alternatively, a key exchange approach may also be used. More examples of the WPA3 authentication process will be described with references to FIGS. 4-6.

At 310, once the wireless device is authenticated, access to the network service or resource is granted and network access is provisioned by the AP according to pre-established logical rules. As mentioned above, the pre-established logical rules may be stored in a rule database connected to the cloud-based provisioning system. The rules are pertinent to the user and the wireless device associated with user, including but not limited to times and dates during which access to the wireless network is permitted via the wireless network access profile, the amount of bandwidth allocated, access to PANs, access to VLANs), and data relevant to the use of the wireless network access profile (e.g., whether the unique PSK has been used for wireless network access previously). The rules may be triggered by an external event. Examples of the external event could include, but are not limited to, a hotel guest making an overnight room reservation, a patient checking in to a doctor's office, an airline traveler purchasing airfare, a tenant or resident signing a lease agreement, etc. Once an event has triggered this process, the access to network services or resources will be granted with the pre-established rules applied.

In some embodiments, additional actions may be performed by the authentication system. These actions could include, but are not limited to, sending commands to any and all network equipment responsible for providing network service or resource, sending billing information to a billing authority, logging transactions in a database management system associated with the network, and so on.

Figure 4:
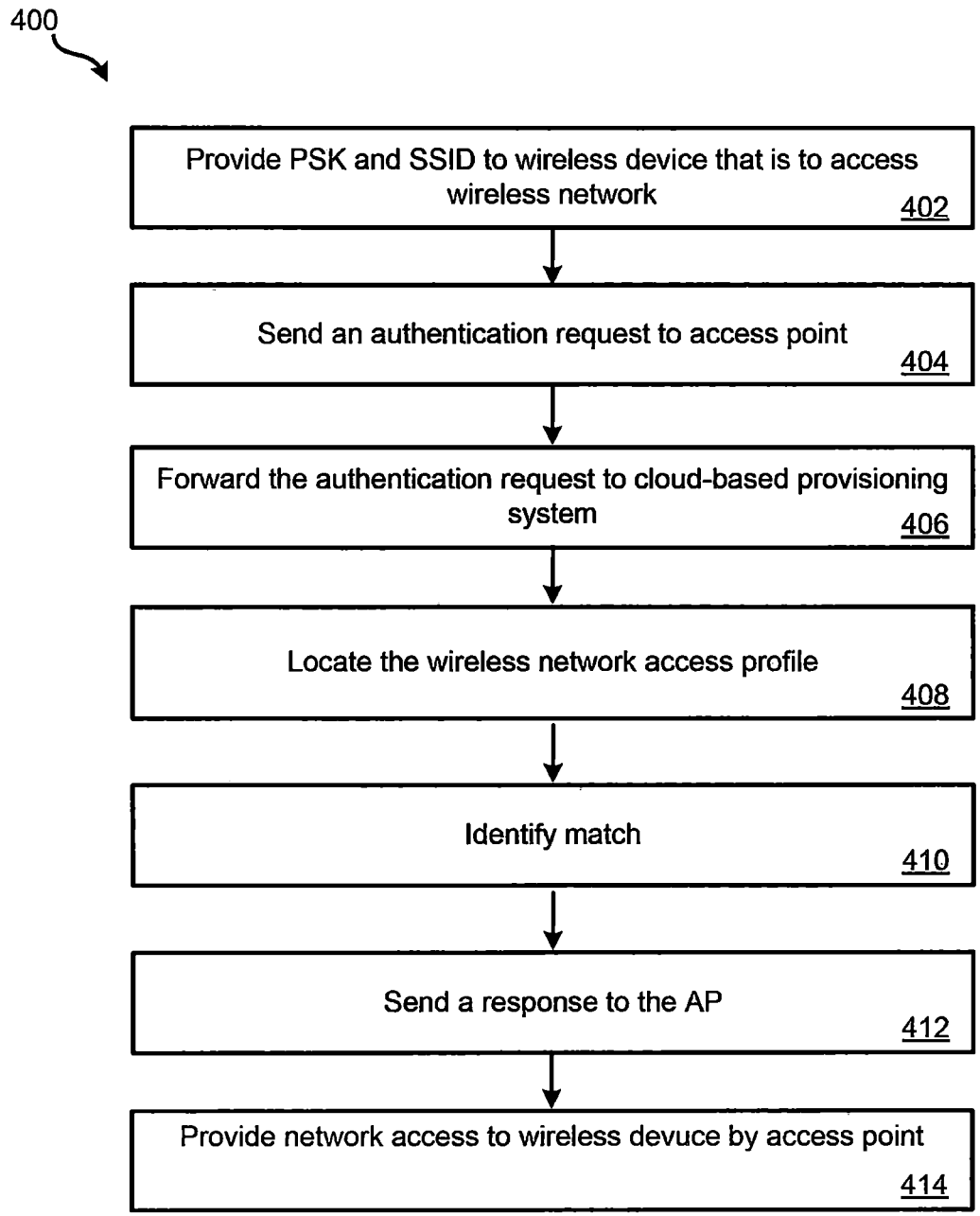
FIG. 4 is a flow diagram illustrating an example method for wireless device authentication using according to various embodiments.

FIG. 4 illustrates an example method 400 for wireless network provisioning using PSK. Method 400 may be performed using system 100, system 200, or some other form of system that allows for wireless network provisioning using WPA3-based authentication. Depending on the implementation, the method 400 may include additional, fewer, or alternative steps performed in various orders or in parallel. Method 400 or any operations thereof may be combined with other methods described herein in any suitable manner.

At 402, a unique PSK and a SSID of a wireless network access profile are provided to the wireless device that is to access the network service or resource. In some embodiments, the unique PSK may be randomly generated and may be checked to ensure it does not match any other PSK associated with the wireless network access profile. The unique PSK may be created using cloud-based provisioning system 110, registration system 120, or some other computerized component that can access profile database 114. The unique PSK may be created and stored in a profile database of a cloud-based provisioning system. The unique PSK, possible with other pertinent information (e.g., a network SSID), may be provided to a user via any of the arrangements previously disclosed such that the user can input the unique PSK to connect with a wireless network.

In some embodiments, a user may be permitted to create his own PSK and provide it to the cloud-based provisioning system for storage in the profile database. For example, the user may access the cloud-based provisioning system via a user interface and may be provided with an opportunity to input a desired PSK. In such an embodiment, the user-created PSK may be checked against other PSKs in the profile database to ensure there are no matches with other PSKs assigned to other users. If there is a match, the user may be required to create a different PSK or both the user and the other user that was already mapped with the matching PSK may be required to each create new PSKs before being permitted to access the network. In some embodiments, the cloud-based provisioning system may define a portion of the PSK and the user may define a portion of the PSK. By the cloud-based provisioning system defining a portion of the PSK, any matches with other PSKs in the profile database may be prevented. For example, the cloud-based provisioning system may specify a unique preamble portion of the PSK (that ensures no matches with other PSKs in the profile database) and the user is permitted to define a later portion of the PSK.

In some embodiments, the unique PSK, possibly along with other information, can be provided to the wireless device that is to access the wireless network. A user may access a network configuration interface and select or input the correct SSID. The user may then be prompted to input the PSK and the password identifier. If the wireless device is an IoT device that does not have a user interface that permits the direct input of data, the user may execute an application on another computerized device or perform some other action to input data on behalf of the IoT device. This other computerized device may transfer the SSID and PSK to the IoT device for use in connecting with the AP.

In some embodiments, a QR code is generated to make it easier for the user to connect to the network without having to manually enter the SSID and password identifier. The QR code can store data such as PSK, password identifier, unique and verified user identifier associated with the user and wireless device. The QR code may be included in the wireless network access profile associated with the wireless device. When the user scans the QR code using the wireless device, the wireless device will automatically send the data and information included in the QR code to the AP.

At 404, a wireless device can attempt to connect with an AP of the wireless network. An authentication request may be generated by the wireless device and transmitted to the AP. The authentication request may include data provided by the user, such as a user-entered PSK, a user-entered password identifier, or additional data (e.g., MAC address, a commit message, a calculated scalar value, a calculated element value, etc.). In some embodiments, a PTK may also be generated based on the PSK, and the PTK may be included in the authentication request. At 406, the AP, on receiving the authentication request, may forward the authentication request along with all or selected data provided or entered by the user to the cloud-based provisioning system.

At 408, the cloud-based provisioning system may search a profile database connected to the cloud-based provisioning system and locate the wireless network access profile associated with the user or the wireless device from the profile database, based on the data provided by the user (e.g., the user-entered PSK and the user-entered password identifier) included in the authentication request. In some embodiments, the cloud-based provisioning system may retrieve additional data from the wireless network access profile and perform additional comparison.

At 410, a match may be identified. A match is determined to be present when the user-provided data included in the authentication request matches the data included the wireless network access profile associated with the user of the wireless device, which has been previously registered in the database connected to the cloud-based provisioning system. In some embodiments, a match is identified when the password identifier included in the authentication request match the password identifier included in the previously registered wireless network access profile.

At 412, once the match of the data included in the authentication request and the data provided by the previously registered wireless network access profile, a response indicating that the wireless device is authenticated is sent from the cloud-based provisioning system to the AP to grant the wireless device access to the wireless network. In some embodiments, the response may include only the PSK associated with the password identifier. In some embodiments, the response may include additional data such as a fully computed and calculated scalar and element. In some embodiments, a PMK is generated based on the PSK and the associated password identifier, and the PMK is also included in the response. In some embodiments, additional data may be collected from the wireless device before access is granted based on data stored in the previously registered wireless network access profile. For instance, a user may be required to provide a user identifier (e.g., username, email address, loyalty number) that matches a stored identifier in the previously registered wireless network access profile and/or the user may be required to accept a set of terms of service provided to the wireless device (or provided to a related wireless device). In some embodiments, the wireless network access profile may be updated to include data about the wireless device that has successfully connected (e.g., that the wireless device has assented to terms of service, the MAC address of the wireless device, etc.).

In some embodiments, the AP can establish an encrypted communication session with the wireless device and grant network (e.g., Internet) access to the wireless device. In some embodiments, data that is stored in the wireless network access profile may be mapped to the PSK may be used to further define the scope of the network access or attach additional conditions, such as the need for terms of service to be agreed to, the amount of bandwidth provided, the total amount of data that is permitted to be uploaded or download, temporal restrictions, and/or whether an additional layer of security, such as conformation of a unique user identifier of the user, needs to be performed before network access is granted via the AP and/or other devices that are used to prepare the connection and/or grant access.

At 414, the provisioning process may be completed and network access based at least in part on the unique PSK is provided to the wireless device. For instance, the network access may be used to access the Internet. In other embodiments, access may be used to grant access to another network, such as an intranet, corporate LAN, etc. In some embodiments, the provisioning process may be used to restrict access to a network. For instance, for a particular device or type of devices (that have been mapped to a particular PSK), the level of access granted to a wireless network may be restricted according to pre-established rules. For instance, a device may be given intranet access but may not be permitted to access the Internet via the intranet.

In some embodiments according to the present disclosure, the method 400 does not involve the use of Message Integrity Code (MIC), which is commonly used in WPA2-based security protocols.

Figure 5:
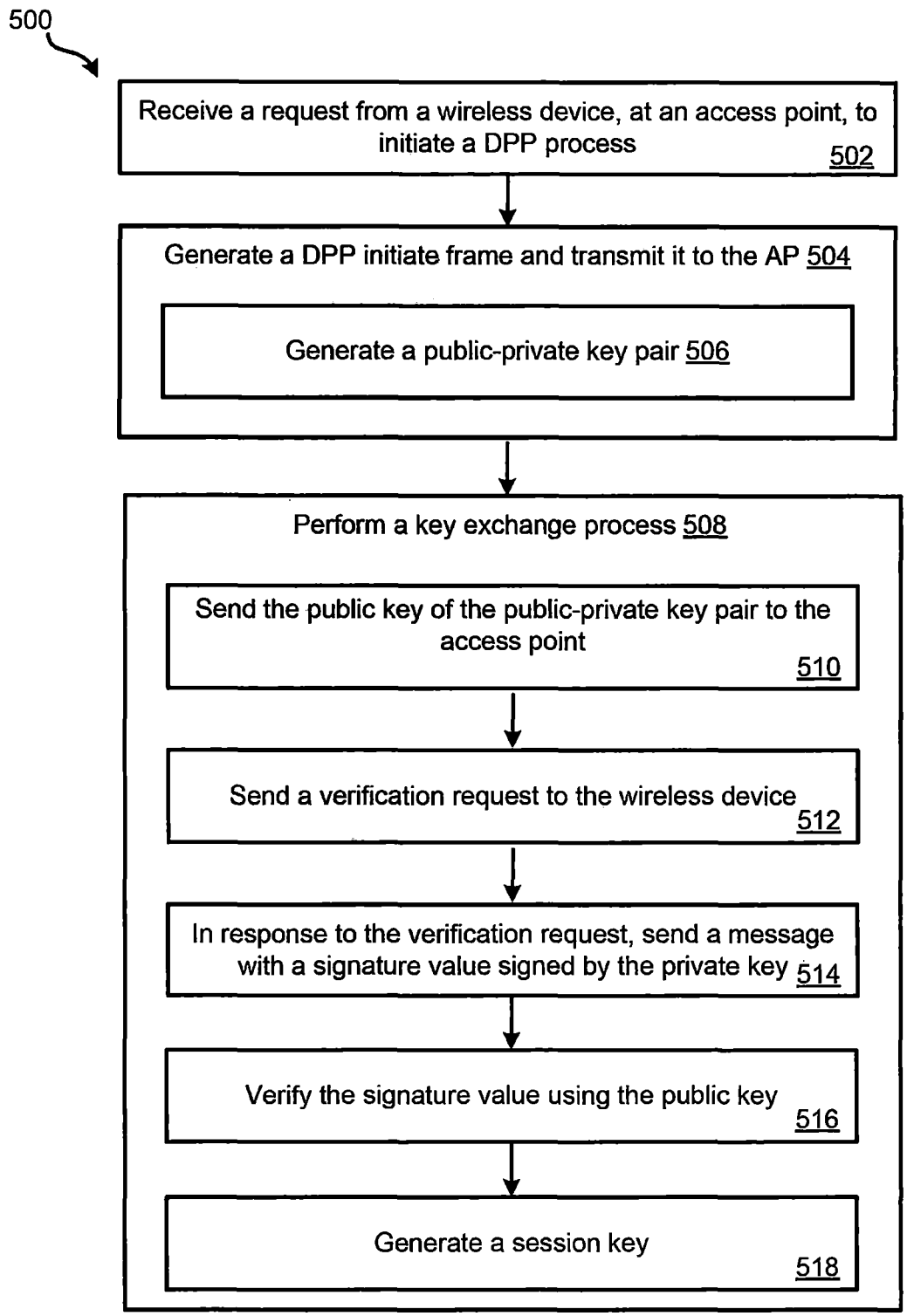
FIG. 5 is a flow diagram illustrating another example method for wireless device authentication using according to various embodiments.

FIG. 5 illustrates an example method 500 for wireless network provisioning utilizing DPP protocols. Method 500 may be alternative or additional to method 400. Method 500 may be performed using system 100, system 200, or some other form of system that allows for wireless network provisioning using WPA3-based authentication. Depending on the implementation, the method 500 may include additional, fewer, or alternative steps performed in various orders or in parallel. Method 500 or any operations thereof may be combined with other methods described herein in any suitable manner.

At 502, a request is sent from a wireless device to an AP to initiate a DPP process. The request may include a message that contains information about the device such as its capabilities and supported protocols. A response message may be sent from the AP to the wireless device. The response message may confirm that the wireless network supports DPP protocols and contain information about the network name, security settings, and the URL to the DPP configuration file, etc. Such information may be used to initiate the WPA3 authentication process.

At 504, a DPP initiate frame is transmitted to the AP. The DPP initiate frame may be generated by the wireless device based on the user information, wireless device identifier (e.g., MAC address), network identifier (e.g., SSID), security settings (e.g., WPA3-Personal or WPA3-Enterprise), wireless device's nonce, DPP configuration file, unique and verified identifiers associated with the user, additional credentials, and other information obtained from the response message sent from the AP. In some embodiments, a public-private key pair is generated by the wireless device at 506.

Different from PSK, public-private key pair includes both a public key that is shared by the wireless device and the AP as well as a private key that is only known to the wireless device. The public key is used to identify the wireless device to the network. The public key is shared with the network during the DPP initiate frame and is used by the network to securely provision the device onto the network. The public key may be generated using asymmetric cryptography and is mathematically related to the private key. On the other hand, the private key is kept secret by the wireless device and is used to sign messages sent to the network to provide integrity protection. Only the wireless device that generated the public-private key pair has access to the private key. The private key may also be generated using asymmetric cryptography and is mathematically related to the public key. The public key is included in the DPP initiate frame, which is sent to the AP. In some embodiments, the public key may be included in the wireless network access profile, but the private key is not included in the wireless network access profile.

At 508, a key exchange process is performed, by the authentication system of the cloud-based provisioning system. The WPA3 authentication process typically utilizes the SAE key exchange protocols to derive a shared key between the device and the network using the device's public-private key pair and the network's private key and secure the communication between the wireless device and the AP. The key exchange protocols may be performed using an algorithm such as Diffie-Hellman algorithm, Elliptic Curve Diffie-Hellman (ECDH) algorithm, and Finite Field Diffie-Hellman (FFDH) algorithm, Dragonfly key exchange algorithm, depending on the security mode and capability of the wireless device.

In some embodiments, operation 508 may further include operations 510-518. At 510, the public key of the public-private key pair is sent to the AP. The public key is used to encrypt and decrypt data communicated between the wireless device and the AP. The public key is further sent to the authentication system of the cloud-based provisioning system.

At 512, a verification request is sent to the wireless device from the authentication system via the AP, to confirm that the wireless device possesses the public key of the private-public key pair that is needed to authenticate with the AP and establish a secure connection to the network service or resource. The verification request may be generated using the SAE protocol in a form of a challenge message. In some embodiments, the challenge message is encrypted using the Diffie-Hellman key exchange algorithm. The wireless device may decrypt the challenge message using the private key of the private-public key pair and send back a response that proves it has the correct private key corresponding to the public key (i.e., the current private-public key pair).

At 514, a response message is generated by the wireless device in response to the verification request. The response message contains the private key corresponding to the public key of the private-public key pair. In some embodiments, the response message contains a first value. The first value may be a hash value signed with the private key of the private-public key pair. For example, a hash of the data included in the response message may be generated by the wireless device using a specific algorithm, and the hash is further signed with the private key of the private-public key pair to produce a signature value that is unique to the data and the private key of the wireless device. In some embodiments, the response message may be encrypted using the public key and sent back to the authentication system via the AP.

At 516, the response message sent from the wireless device is received by the AP and further transmitted to the authentication system. The response message is decrypted using the public key, and a second value is calculated by the authentication system. A determination is made on whether the second value matches the first value included in the response message. A match of the first and second values ensures that the wireless device is in possession of the private key associated with the public key that was exchanged earlier in the key exchange process.

In some embodiments, the public key of the private-public key pair is retrieved by the authentication system, for example, from the wireless network access profile previously registered in the authentication system and stored in the profile database. A two-step verification may be performed by the authentication system to verify the hash value and the signature value. The first value may be verified by the authentication system by independently calculating the hash value of the data included in the response message using the same algorithm as the wireless device. The signature value may be verified using the public key, as mentioned above. In some embodiments, a mathematical operation on the signature value is performed using the public key to produce a result. A determination is made on whether the result matches the hash value calculated by the authentication process. If the two values match, the signature is considered valid and the access point can be confident that the wireless device is in possession of the private key that corresponds to the public key it provided earlier.

At 518, a session key is generated and shared between the wireless device and the AP in response to the verified signature. The session key may be derived from the shared secret calculated during the key exchange process between the wireless device and the AP, along with the other data exchanged earlier, using a key derivation function (KDF). For example, the wireless device and the authentication system may each create a pre-shared secret value known exclusively to each thereof. The key derivation function (KDF) may be used to incorporate the pre-shared value along with a random number (salt) and the user identity or device information obtained from the wireless network access profile as well as the SSID of the network to produce the session key. The session key may be used to encrypt and decrypt data transmitted between the access point and wireless device during the session.

Figure 6:
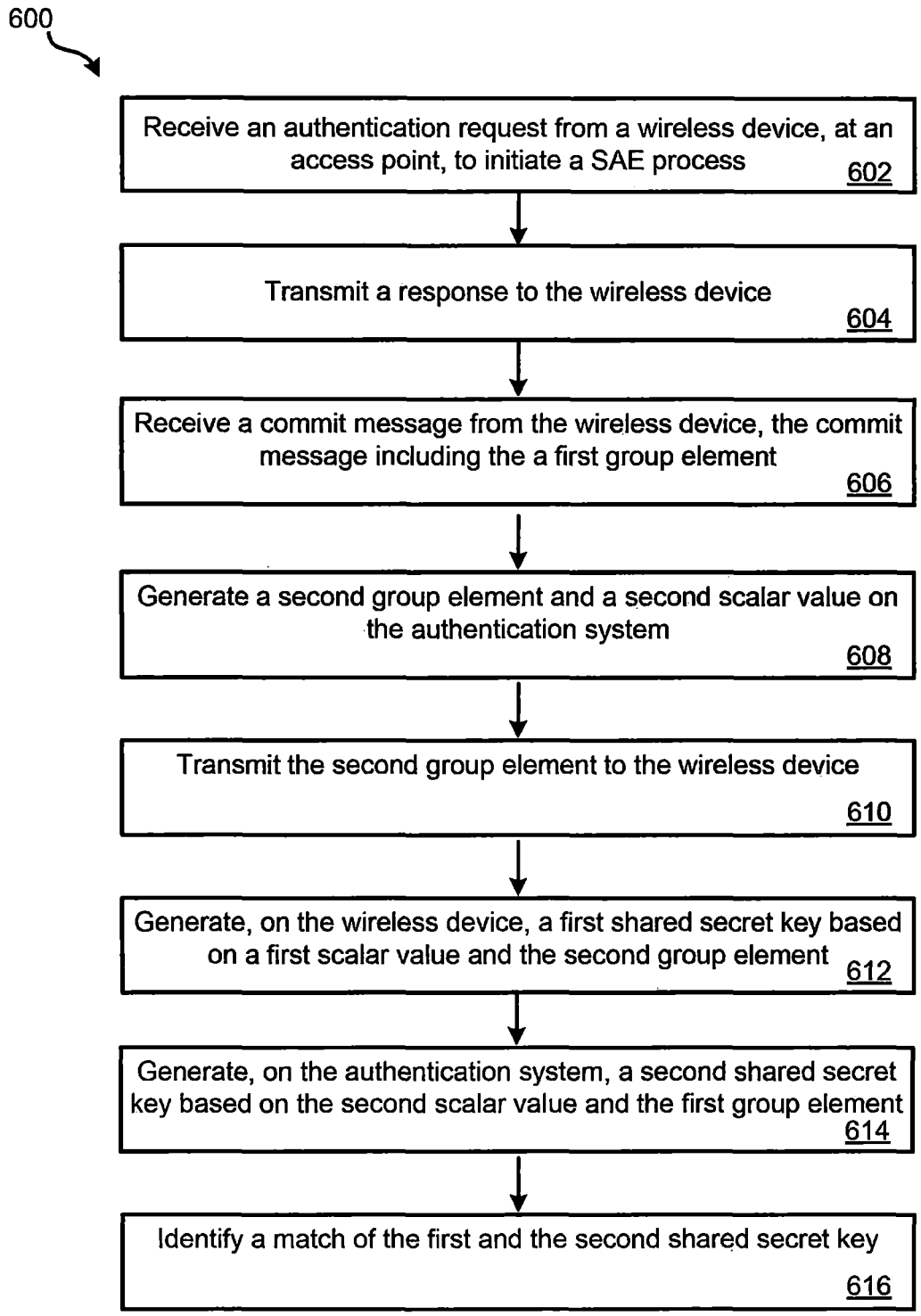
FIG. 6 is a flow diagram illustrating a further example method for wireless device authentication using according to various embodiments.

FIG. 6 illustrates an example method 600 for wireless network provisioning utilizing SAE protocols. Method 600 may be alternative or additional to methods 400 and 500. Method 600 may be performed using system 100, system 200, or some other form of system that allows for wireless network provisioning using WPA3-based authentication. Depending on the implementation, the method 600 may include additional, fewer, or alternative steps performed in various orders or in parallel. Method 600 or any operations thereof may be combined with other methods described herein in any suitable manner.

At 602, an authentication request is sent from the wireless device that attempts to access a network service or resource via an AP. The authentication request is received by the AP and further transmitted to an authentication system of a cloud-based provisioning system for authentication. Both the authentication system and the wireless device have capabilities to support WPA3 and SAE protocols. The authentication request may further include user-provided user credentials and information associated with the wireless device. Such user-provided credentials and device information may be compared with the user credentials and device information previously stored in a wireless network access profile and registered in a profile database connected to the authentication system as described herein.

At 604, a response is sent to the wireless device from the authentication system via the AP. The response may include a message confirming the identity of the wireless device and the specific key exchange algorithm or configuration document regarding the key exchange protocols. In some embodiments, upon receipt of the authentication request, the wireless device is identified. For example, the profile database associated with the authentication system is searched to locate the wireless device access profile previously registered on the authentication system, and the user credentials and device information associated with the wireless device are retrieved from the wireless device access profile to identify the wireless device.

At 606, a first group element and a first scalar value are generated by the wireless device, using a key exchange algorithm. An example of the key exchange algorithm is Diffie-Hellman algorithm. The group element may be in a form of a pair of coordinates (x, y), where x and y are 256-bit numbers. The coordinates are used to calculate a generator point on an elliptic curve that serves as the group element. The generator point is agreed upon by both the wireless device and the authentication system. The first group element may be calculated using the scalar value and the generator point on the specific elliptic curve. A commit message is generated by the wireless device, and the first group element and the first scalar value are included in the commit message.

At 608, a second group element and a second scalar value are generated by the authentication system using the same key exchange algorithm. The second group element may be generated in a similar manner to the first group element. At 610, the second group element is transmitted to the wireless device in the key exchange process. At 612, a first shared secret key is generated on the wireless device. The first shared secret key is calculated based on the first scalar value and the second group element provided by the authentication system using a pre-established construct. The first shared secret key is then transmitted to the authentication system via the AP. At 614, likewise, a second shared secret key is generated on the authentication system based on the second scalar value and the first group element provided by the wireless device using the same pre-established construct. The second shared secret key is-transmitted to the authentication system via the AP. At 616, a match of the first and the second shared secret key is identified to confirm the authentication of the wireless device. A confirmation message of successful authentication may be sent to the wireless device.

It is noted that the methods 400 and 500 described herein (i.e., the DPP-based protocols and the SAE-based protocols) both utilize a key exchange process and may not involve PSK in the WPA3 authentication process. Compared with the PSK-based protocol, the DPP-based protocols and the SAE-based protocols may provide enhanced security, generally simplified configuration, simplified communication between the wireless device and the authentication system, and better resistance to dictionary attacks on the PSK. In addition, the wireless network access profile created and registered on the authentication system may provide another layer of protection for the user to access the network service and resource.

Example Computer System/Device

Figure 7:
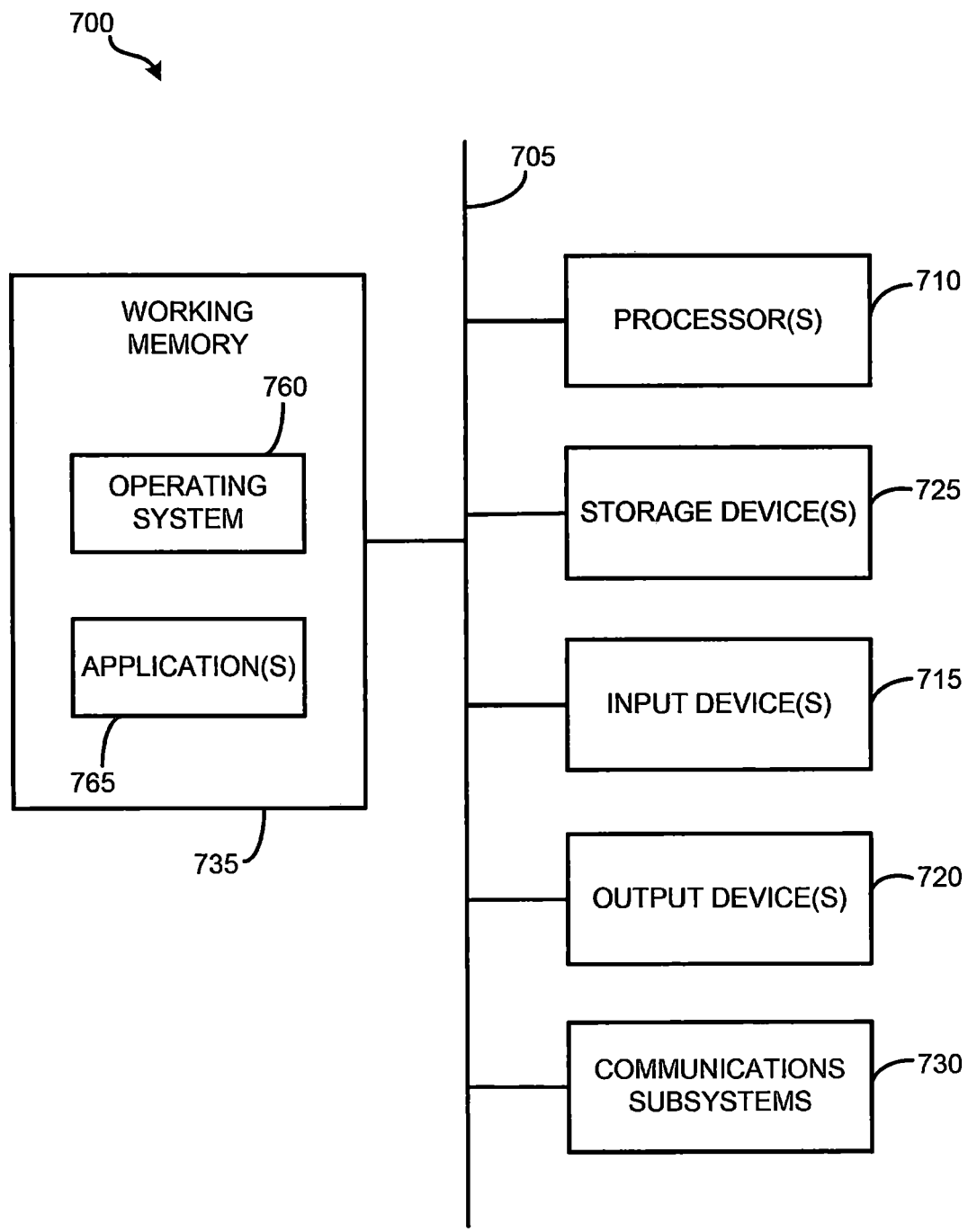
FIG. 7 is a schematic diagram illustrating an embodiment of a computer system according to various embodiments.

FIG. 7 is a schematic diagram illustrating an example of computer system 700 (sometimes also referred to as a "computer device" 700). The computer system 700 is a simplified computer system that can be used to implement various embodiments described and illustrated herein. A computer system 700 as illustrated in FIG. 7 may be incorporated into devices such as a portable electronic device, mobile phone, wireless device, server, or other device and system as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/ or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/ code to processor(s) 710 for execution and/or might be used to store and/or carry such instructions/code. In many implementations, a computer-readable medium is a physical and/ or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps/operations may be undertaken before, during, or after the above elements are considered. Accordingly, the above description does not bind the scope of the claims.

What is claimed is:

1. A method for provisioning wireless network access to a wireless device, the method comprising:
   creating, in a cloud-based provisioning system, a wireless network access profile that includes a user identifier associated with the wireless device;
   receiving, on an access point, an authentication request sent from the wireless device;
   identifying, by the cloud-based provisioning system, the wireless device based on the user identifier associated with the wireless device;
   performing, on the cloud-based provisioning system, WPA3-based authentication to authenticate the wireless device, wherein performing the WPA3-based authentication further comprises performing a key exchange process between the wireless device and the cloud-based provisioning system by:
      generating, on the wireless device, a first group element, and a first scalar value, and on the cloud-based provisioning system, a second group element, and a second scalar value using an agreed-upon algorithm between the wireless device and the cloud-based provisioning system;
      generating, on the wireless device, a first shared secret key based on the first scalar value and the second group element using the agreed-upon algorithm;
      generating, on the authentication system, a second shared secret key based on the second scalar value and the first group element using the agreed-upon algorithm; and
      identifying, by the authentication system, a match of the first shared secret key and the second shared secret key; and
   providing, via the access point, wireless network access to the wireless device.

2. The method of claim 1, wherein the wireless network access profile further comprises a plurality of preestablished rules including a bandwidth restriction and a time period for which network access is permitted, and wherein the network access is provided to the wireless device for the time period indicated by the wireless network access profile in accordance with a bandwidth restriction.

3. The method of claim 1, wherein the user identifier is at least one of a username, an email address, a customer loyalty number, an apartment number, a hotel room number, a patient record identifier, a MAC address of the wireless device, an employee ID, a home address, a birthdate, a membership number, and a reservation number.

4. The method of claim 1, wherein the wireless network access profile is generated manually by the user of the wireless device through a user interface of the wireless device.

5. The method of claim 1, wherein the wireless network access profile is generated by an authorized representative.

6. The method of claim 1, wherein performing the key exchange process further comprises:
generating, by the wireless device, a public-private key pair that comprises a public key and a private key;
receiving, on the cloud-based provisioning system, the public key sent from the wireless device;
sending a verification request to the wireless device;
receiving, on the cloud-based provisioning system, a response message sent from the wireless device, the response message containing a signature value signed by the private key; and
verifying, by the cloud-based provisioning system, the signature value using the public key.

7. The method of claim 6, wherein performing the key exchange process further comprising:
generating, by the cloud-based provisioning system, a session key based on a pre-shared secret value between the wireless device and the cloud-based provisioning system, wherein the session key is used to encrypt and decrypt data transmitted between the access point and wireless device during a session.

8. The method of claim 1, wherein performing the key exchange process further comprises:
sending a message to the wireless device, the message indicating the agreed-upon algorithm to be used in the key exchange process.

9. The method of claim 1, further comprising:
requesting the user identifier from the wireless device;
receiving a user-provided user identifier provided from the wireless device; and
comparing, by the cloud-based provisioning system, the user-provided user identifier to the user identifier that is part of the wireless network access profile, wherein providing network access is conditional on the user identifier matching the stored user identifier.

10. The method of claim 1, further comprising:
updating the wireless network access profile to include data regarding authentication of the wireless device.

11. A cloud-based provisioning system, comprising:
one or more processors; and
a computer-readable storage medium storing computer-executable instructions that, when executed by the one or more processors, causes the one or more processors to:
create a wireless network access profile for a wireless device, the wireless network access profile storing a user identifier associated with the wireless device;
receive an authentication request sent from the wireless device;
identify the wireless device based on the user identifier associated with the wireless device;
perform a process of WPA3-based authentication to authenticate the wireless device, wherein the process of WPA3-based authentication further comprises performing a key exchange process between the wireless device and the cloud-based provisioning system by:
generating, on the wireless device, a first group element, and a first scalar value, and on the cloud-based provisioning system, a second group element, and a second scalar value using an agreed upon algorithm between the wireless device and the cloud-based provisioning system;
generating, on the wireless device, a first shared secret key based on the first scalar value and the second group element using the agreed-upon algorithm;
generating, on the authentication system, a second shared secret key based on the second scalar value and the first group element using the agreed-upon algorithm; and
identifying, by the authentication system, a match of the first shared secret key and the second shared secret key; and
provide network access to the wireless device.

12. The cloud-based provisioning system of claim 11, wherein, the instructions are further executable to cause one or more processors to:
request the user identifier from the wireless device;
receive a user-provided user identifier from the wireless device; and
compare the user-provided user identifier to the user identifier that is part of the wireless network access profile, wherein providing network access is conditional on the user identifier matching the user identifier.

13. The cloud-based provisioning system of claim 11, wherein the wireless network access profile further comprises a plurality of preestablished rules including a bandwidth restriction and a time period for which network access is permitted, and wherein the network access is provided to the wireless device for the time period indicated by the wireless network access profile in accordance with a bandwidth restriction.

14. The cloud-based provisioning system of claim 11, wherein the user identifier is at least one of a username, an email address, a customer loyalty number, an apartment number, a hotel room number, a patient record identifier, a MAC address of the wireless device, an employee ID, a home address, a birthdate, a membership number, and a reservation number.

15. The cloud-based provisioning system of claim 11, wherein the wireless network access profile is generated manually by the-user of the wireless device through a user interface of the wireless device.

16. The cloud-based provisioning system of claim 11, wherein the key exchange process further comprises:
generating, by the wireless device, a public-private key pair that comprises a public key and a private key;
receiving, on the cloud-based provisioning system, a public key of a public key pair sent from the wireless device, wherein the public key pair is generated by the wireless device and comprises the public key and a private key;
sending, by the cloud-based provisioning system, a verification request to the wireless device;
receiving, on the cloud-based provisioning system, a response message sent from the wireless device, the response message containing a signature value signed by the private key; and
verifying, by the cloud-based provisioning system, the signature value using the public key.

17. The cloud-based provisioning system of claim 16, wherein the key exchange process further comprising:
generating, by the cloud-based provisioning system, a session key based on a pre-shared secret value between the wireless device and the cloud-based provisioning system, wherein the session key is used to encrypt and decrypt data transmitted between the access point and wireless device during a session.

18. The cloud-based provisioning system of claim 11, wherein the key exchange process further comprises:
sending, by the cloud-based provisioning system, a message to the wireless device, the message indicating the agreed-upon algorithm to be used in the key exchange process.

* * * * *